United States Patent [19]
Jenner

[11] 3,837,364
[45] Sept. 24, 1974

[54] FLEXIBLE SHEATH FOR TACHOMETER SHAFTS OR THE LIKE

[75] Inventor: Heinrich Jenner, Hassfurt/Main, Germany

[73] Assignee: Frankische Isolierrohr-und Metallwaren-Werke Gebr. Kirchner, Konigsberg/Bayern, Germany

[22] Filed: Nov. 21, 1972

[21] Appl. No.: 308,330

[30] Foreign Application Priority Data
Nov. 25, 1971 Germany............................ 7144438

[52] U.S. Cl. ................. 138/122, 138/111, 64/32 F
[51] Int. Cl. ............................................ F16l 11/12
[58] Field of Search ........... 138/111, 114, 118, 121, 138/122, 129, 137, 140; 64/3, 32 R, 32 F

[56] References Cited
UNITED STATES PATENTS

| | | | |
|---|---|---|---|
| 1,026,598 | 5/1912 | Neff.................................... | 138/118 |
| 1,340,818 | 9/1916 | Brinkman ................................ | 64/3 |
| 2,367,643 | 1/1945 | Hendrie ................................ | 138/129 |
| 2,756,032 | 7/1956 | Dowell.................................. | 138/114 |
| 3,047,026 | 7/1962 | Kahn.................................... | 138/137 |
| 3,117,596 | 1/1964 | Kahn.................................... | 138/122 |

Primary Examiner—Herbert Goldstein
Attorney, Agent, or Firm—Michael S. Striker

[57] ABSTRACT

A synthetic plastic soundproofing and heat-insulating sheath for a tachometer shaft has a thin-walled flexible cylindrical tube which surrounds a first set of hollow flexible ribs and is surrounded by a second set of hollow flexible ribs. The ribs of the first set may constitute circumferentially complete annuli or one or more helices, and the ribs of the second set may extend in parallelism with the axis of the tube or constitute circumferentially complete annuli or one or more helices. The profile of the ribs is rectangular or trapeziform, and the width of helical or annular ribs of the second set may exceed the width of ribs of the first set, as considered in the axial direction of the tube. The ribs of one or both sets may form part of a discrete corrugated tube which is surrounded by or surrounds the cylindrical tube, or portions of the ribs of at least one set may form part of a second tube which is spaced apart from and surrounds or is surrounded by the cylindrical tube.

20 Claims, 6 Drawing Figures

FLEXIBLE SHEATH FOR TACHOMETER SHAFTS OR THE LIKE

BACKGROUND OF THE INVENTION

The present invention relates to improvements in protective sheaths for flexible shafts or the like, and more particularly to improvements in protective sheaths which can be applied around flexible drive shafts in speedometers, tachometers or analogous instruments.

It is known to provide the drive shaft of a tachometer with a tubular protective sheath which consists of foam rubber. Such foam rubber sheaths serve primarily as a soundproofing and secondarily as a heat insulating means. Their main purpose is to reduce or eliminate knocking noises in the passenger compartments of automobiles, buses or similar vehicles or in driver compartments of trucks. A drawback of foam rubber sheaths is that they cannot be readily applied around a flexible shaft. Moreover, their manufacture is complex and expensive.

SUMMARY OF THE INVENTION

An object of the invention is to provide a novel and improved tubular sheath for use as a heat-insulating, soundproofing and/or protective body around flexible shafts or the like, particularly around the inner core or around the casing of a flexible drive shaft in a speedometer, tachometer or an analogous instrument.

Another object of the invention is to provide a protective sheath which is less expensive, more versatile, longerlasting and more rugged than heretofore known protective sheaths consisting of foam rubber or the like.

A further object of the invention is to provide a protective sheath whose mechanical, heat-insulating and soundproofing characteristics are superior to those of presently known sheaths.

An additional object of the invention is to provide a protective sheath which can be produced from a variety of readily available materials and by resorting to conventional machinery.

The invention is embodied in a protective sheath, particularly for use as a heat-insulating and/or soundproofing covering for flexible drive shafts of speedometers, tachometers or analogous instruments, which comprises a preferably thinwalled flexible synthetic plastic tube, a first set of hollow ribs which are adjacent to the inner side of the tube and preferably form circumferentially complete annuli or one or more helices, and a second set of hollow ribs which are adjacent to the outer side of the tube and may extend in at least substantial parallelism with the axis of the tube so that they can be extruded therewith through the die of a suitable extruding machine. Alternatively, the ribs of the second set may constitute circumferentially complete annuli or one or more helices around the outer side of the tube. The ribs of the inner and/or outer set may constitute a discrete corrugated tube which is inserted into or slipped onto the first-mentioned tube.

The novel features which are considered as characteristic of the invention are set forth in particular in the appended claims. The improved sheath itself, however, both as to its construction and the mode of producing and assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
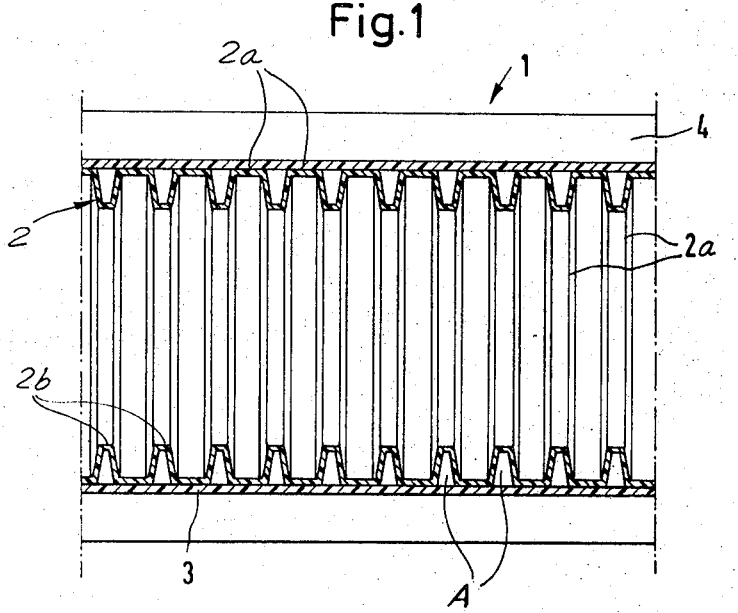
FIG. 1 is a fragmentary axial sectional view of a synthetic plsatic protective sheath which embodies one form of the invention.
Figure 2:
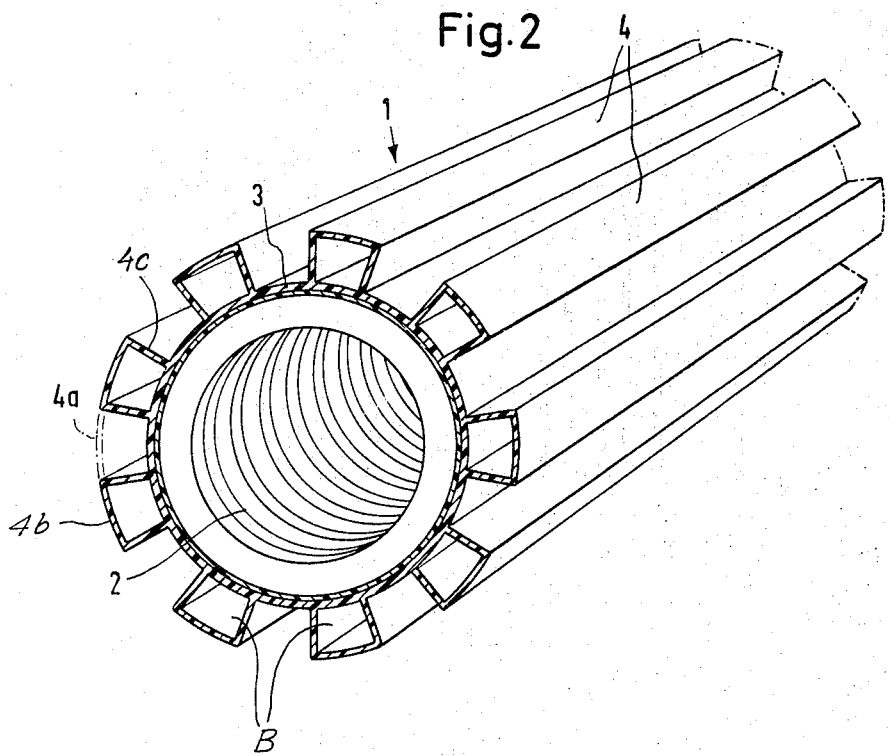
FIG. 2 is a perspective view of the sheath shown in FIG. 1.

Referring first to FIGS. 1 and 2, there is shown on a greatly enlarged scale a protective sheath 1 which can be used to surround the inner core or the casing of a flexible drive shaft in a speedometer or tachometer. The sheath 1 comprises a flexible cylindrical tube 3 which surrounds a corrugated tube 2 having a set of circumferentially complete hollow annular ribs 2a abutting against the inner side of the tube 3. The sheath 1 further comprises a set of axially parallel hollow ribs 4 which are adjacent to the outer side of the tube 3.

The material of the tubes 2, 3 and ribs 4 is preferably a relatively soft synthetic plastic substance to thus enhance the flexibility of the sheath 1. Furthermore, the soundproofing characteristics of soft plastics are far superior to those of harder plastics. The corrugated tube 2 may consist of polyvinyl chloride and may have a wall thickness of substantially less than 1 millimeter, for example, 0.3 millimeter at a maximum diameter of about 18 millimeters of the tube 2. The wall thickness of the tube 3 is also less than 1 millimeter, for example, in the range of 0.5 millimeter. The wall thickness of the ribs 4 can be about 0.3 millimeter, i.e., the same as that of the tube 3.

The outer ribs 4 are shown as being integral with the tube 3. This is of advantage because the tube 3 and the ribs 4 can be produced simultaneously by resorting to a suitable extruding apparatus. The wall thickness of the ribs 4 and tube 3 is preferably less than the wall thickness of the corrugated tube 2 because the latter is more readily flexible (due to the fact that it comprises annular rather than axially parallel ribs). Owing to the more pronounced flexibility of the tube 2, the tube 3 and the ribs 4 may be made of a synthetic plastic material (e.g., polyvinyl chloride) which is softer than the material of the tube 2.

If desired, the sheath 1 may comprise a third cylindrical tube by providing it with webs 4a (only one shown in FIG. 2 by phantom lines) which, together with the outermost portions 4b of the axially parallel ribs 4, form a cylindrical tube which is spaced apart from and surrounds the tube 3. In such a sheath, the corrugated tube 2 is surrounded by a body having two coaxial cylindrical tubes and radial walls 4c extending between the two coaxial tubes.

As mentioned above, the sheath 1 can be produced in a suitable extruding apparatus which forms the tube 3 simultaneously with the ribs 4. The die of the extruding apparatus can be provided with a central opening through which the corrugated tube 2 is fed into the growing tube 3. The ribs 2a exhibit a trapeziform profile and the profile of the ribs 4 is at least substantially rectangular. Such profiles enhance the sound damping characteristics of the sheath.

Figure 3:
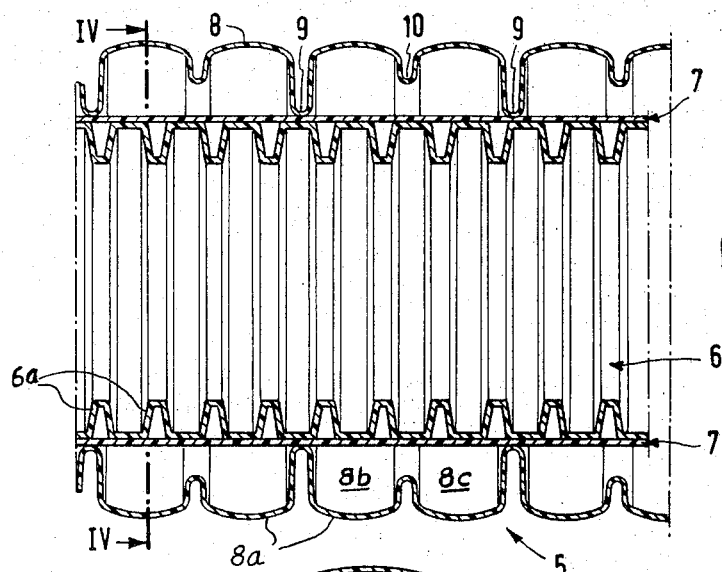
FIG. 3 is an axial sectional view of a portion of a second protective sheath.
Figure 4:
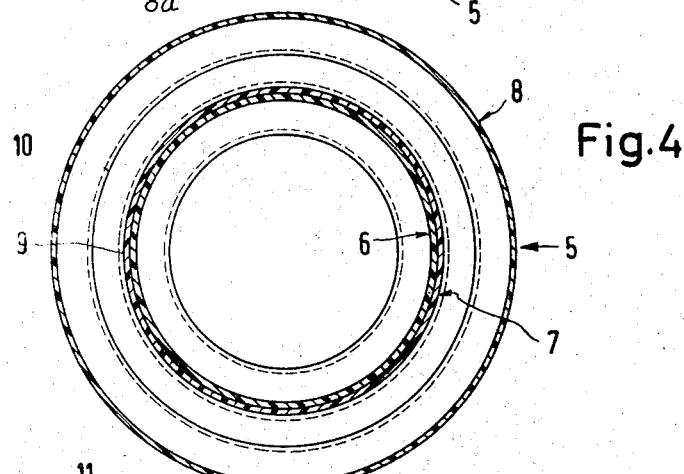
FIG. 4 is a sectional view as seen in the direction of arrows from the line IV—IV of FIG. 3.

The protective sheath 5 of FIGS. 3 and 4 comprises a flexible synthetic plastic corrugated tube 6 (corresponding to the tube 2 of FIGS. 1–2), a cylindrical tube 7 which also consists of flexible synthetic plastic material and surrounds the corrugated tube 6, and a second corrugated tube 8 which consists of flexible synthetic plastic material and surrounds the tube 7. The hollow corrugations 6a and 8a of the tubes 6 and 8 are circumferentially complete annular ribs which are respectively surrounded by and surround the tube 7. The material of the tube 7 is preferably softer than the material of the more readily flexible corrugated tube 6 and/or 8. The tube 7 can be produced in an extruding apparatus whose die may have a central opening for the feeding of corrugated tube 6 directly into the growing tube 7.

It will be noted that the width of ribs 6a of the inner corrugated tube 6 is less than the width of ribs 8a forming part of the outer corrugated tube 8 (as considered in the longitudinal direction of the tube 7). Also, each of the ribs 8a is formed with a relatively shallow circumferential notch 10 so that it defines two annular compartments 8b, 8c which communicate with each other. The reference characters 9 denote the neck portions of ribs 8a which contact or come close to the outer side of the tube 7. The outer corrugated tube 8 is preferably slipped onto the tube 7 after the latter has received the inner corrugated tube 6.

Figure 5:
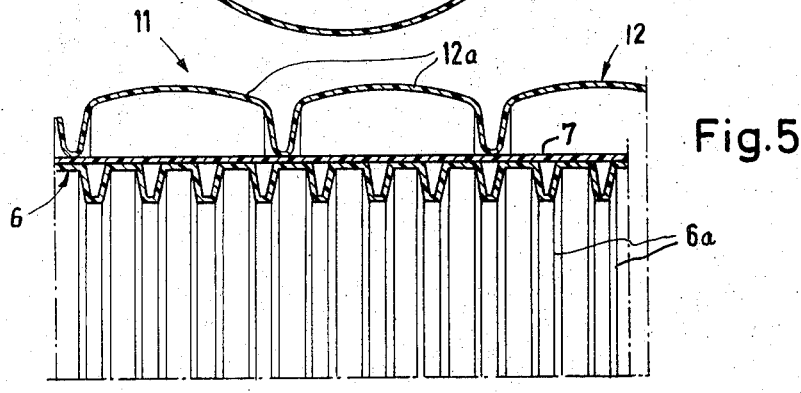
FIG. 5 is a fragmentary axial sectional view of a portion of a third protective sheath.

The protective sheath 11 of FIG. 5 is similar to the sheath 5 with the exception that the ribs 12a of the outer corrugated tube 12 are not formed with notches (see the notches 10 in FIG. 3). The width of each rib 12a (as considered in the longitudinal or axial direction of the tube 7) may but need not exceed the width of a rib 8a. As shown, the width of a rib 12a is at least three times the width of a rib 6a. The sheath 11 constitutes the presently preferred embodiment of the invention.

Figure 6:
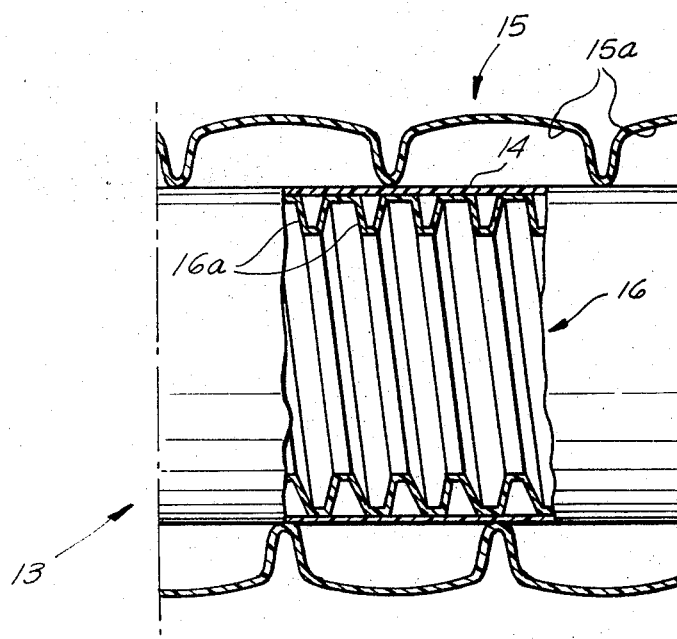
FIG. 6 is an axial sectional view of a portion of a fourth protective sheath.

FIG. 6 shows a portion of a protective sheath 13 having a centrally located cylindrical tube 14, an outer corrugated tube 15 whose hollow ribs 15a from a continuous helix around the outer side of the tube 14, and an inner corrugated tube 16 whose hollow ribs 16a form a continuous helix along the inner side of the tube 14. The lead of the helices is preferably small.

Each of the illustrated protective sheaths exhibits two discrete groups of air chambers. Thus, and referring again to FIGS. 1 and 2, the tube 3 defines with the corrugated tube 2 a first group of annular air chambers A, and the tube 3 defines with the ribs 4 a second group of longitudinally extending air chambers B which are separated from the chambers A. Such construction insures that the sheath exhibits highly satisfactory soundproofing and heat-insulating characteristics.

It will be noted that the ribs of at least one set are separated or spaced apart from each other. Thus, and referring to FIGS. 1 and 2, the ribs 4 at the outer side of the tube 3 are separated from each other by exposed portions of the tube 3. Analogously, the annular ribs 2a of the tube 2 are seprated from each other by relatively narrow ring-shaped webs 2b. The spacing apart of ribs at the inner and/or outer side of the cylindrical central tube enchances the flexibility of the sheath.

Without further analysis, the foregoing will so fully reveal the gist of the present invention that others can, by applying current knowledge, readily adapt it for various applications without omitting features which fairly constitute essential characteristics of the generic and specific aspects of my contribution of the art and, therefore, such adaptations should and are intended to be comprehended within the meaning and range of equivalence of the claims.

What is claimed as new and desired to be protected by Letters Patent is set forth in the appended claims:

1. A protective sheath for a flexible drive shaft, particularly of a speedometer, tachometer or an analogous instrument, comprising a flexible synthetic plastic tube having an inner side and an outer side; a first set of flexible ribs adjacent to said inner side and defining a first plurality of compartments adjacent said inner side; and a second set of flexible ribs adjacent to said outer side and defining a second plurality of compartments adjacent said outer side, the ribs of at least one of said sets extending substantially circumferentially of said tube.

2. A sheath as defined in claim 1, wherein the wall thickness of said tube is less than 1 millimeter.

3. A sheath as defined in claim 1, wherein the ribs of at least one of said sets are of at least substantially annular shape.

4. A sheath as defined in claim 1, wherein the ribs of said first set are spaced apart from each other.

5. A sheath as defined in claim 1, wherein the ribs of said second set are spaced apart from each other.

6. A sheath as defined in claim 1, wherein the ribs of said first set form at least one helix along the inner side of said tube.

7. A sheath as defined in claim 1, wherein the ribs of said first set form a plurality of circumferentially complete annuli.

8. A sheath as defined in claim 1, wherein the ribs of said second set extend at least substantially in the longitudinal direction of said tube.

9. A sheath as defined in claim 8, wherein the ribs of said second set are integral with said tube.

10. A sheath as defined in claim 1, wherein the ribs of said second set form at least one helix surrounding said tube.

11. A sheath as defined in claim 1, wherein the ribs of said second set form a plurality of circumferentially complete annuli around said tube.

12. A sheath as defined in claim 1, wherein the ribs of said second set form a discrete corrugated tube which surrounds said first mentioned tube.

13. A sheath as defined in claim 12, wherein the corrugations of said corrugated tube form at least one helix.

14. A sheath as defined in claim 12, wherein the corrugations of said corrugated tube form a plurality of circumferentially complete annuli around said first mentioned tube.

15. A sheath as defined in claim 1, wherein the ribs of said first set form a discrete corrugated tube which is surrounded by said first mentioned tube.

16. A sheath as defined in claim 1, wherein the ribs of at least one of said sets exhibit a substantially trapeziform profile.

17. A sheath as defined in claim 1, wherein the ribs of at least one of said sets exhibit a substantially rectangular profile.

18. A sheath as defined in claim 1, further comprising a second flexible synthetic plastic tube including portions of one of said sets of ribs, one of said tubes being spaced apart from and being surrounded by the other of said tubes.

19. A sheath as defined in claim 1, wherein the ribs of each of said sets extend substantially circumferentially of said tube and the width of ribs in one of said sets, as considered in the longitudinal direction of said tube, exceeds the width of ribs of the other of said sets.

20. A sheath as defined in claim 1, wherein at least some of the compartments of at least one of said pluralities of compartments communicate with one another.

* * * * *